(12) United States Patent
Dyko et al.

(10) Patent No.: US 6,419,056 B1
(45) Date of Patent: Jul. 16, 2002

(54) APPARATUS FOR AIRCRAFT BRAKE THERMAL MANAGEMENT

(75) Inventors: Mark P. Dyko, Hartville; Scott G. Knight, Wadsworth, both of OH (US)

(73) Assignee: Aircraft Braking Systems Corp., Akron, OH (US)

( * ) Notice: Subject to any disclaimer, the term of this patent is extended or adjusted under 35 U.S.C. 154(b) by 0 days.

(21) Appl. No.: 09/182,059

(22) Filed: Oct. 29, 1998

(51) Int. Cl.[7] .............................................. F16D 65/78
(52) U.S. Cl. ................. 188/264 G; 188/71.6; 188/264 AA; 188/264 A
(58) Field of Search .................. 188/264 G, 264 A, 188/264 AA, 71.1, 71.4, 71.5, 71.6, 73.2, 218 XL, 18 A; 192/107 R, 107 M; 301/6.91, 6.1; 244/121

(56) References Cited

U.S. PATENT DOCUMENTS

| | | | | |
|---|---|---|---|---|
| 3,708,042 A | * | 1/1973 | Krause et al. | 188/73.2 |
| 3,983,974 A | * | 10/1976 | Dowell et al. | 188/264 AA |
| 4,450,940 A | * | 5/1984 | Herbulot | 188/264 G |
| 4,863,000 A | * | 9/1989 | Patel | 188/218 XL |
| 5,107,968 A | * | 4/1992 | Delpassand | 188/264 G |
| 5,236,249 A | * | 8/1993 | Han et al. | 301/6.91 |
| 5,437,352 A | * | 8/1995 | Harker | 188/71.5 |
| 5,503,254 A | * | 4/1996 | Fisher et al. | 188/71.5 |
| 5,568,846 A | * | 10/1996 | Dagh et al. | 188/218 XL |
| 5,850,895 A | * | 12/1998 | Evrard | 188/218 XL |
| 5,851,056 A | * | 12/1998 | Hyde | 188/264 G |

* cited by examiner

*Primary Examiner*—Paul N. Dickson
*Assistant Examiner*—Mariano Sy
(74) *Attorney, Agent, or Firm*—Renner, Kenner, Greive, Bobak, Taylor & Weber (57) ABSTRACT

Apparatus for aircraft brake thermal management including heat shields made of one or more insulating pouches of metallic foil having ceramic fibers or other appropriate insulation therein. The pouches are either vacuum sealed or provided with pin hole breathing apertures to eliminate expansion forces, while precluding the entry of cleaning fluids, moisture and the like into the cavity thereof. The invention further provides for brake rotor and stator disks having lugs of increased shear strength, while providing cooling apertures or slots therein. Finally, the invention includes a heat shield interposed between an aircraft wheel and the brake disk stack, and wherein the heat shield is flared at an end thereof to maximize the ingress and egress of cooling air to optimize aircraft turnaround time.

17 Claims, 6 Drawing Sheets

APPARATUS FOR AIRCRAFT BRAKE THERMAL MANAGEMENT

TECHNICAL FIELD

The invention herein resides in the art of braking systems and, more particularly, to braking systems for aircraft. More specifically, the invention relates to apparatus employed in such braking systems for minimizing the heat buildup within the brake assembly and the transfer of heat among parts, and maximizing the ventilation and cooling of the heat stack. The invention presents a unique heat shield structure, rotor and stator disk configuration, and a flared heat shield, all of which provide for either improved thermal isolation of braking system components or improved thermal dissipation from the heat stack.

BACKGROUND ART

Aircraft brakes, whether of steel, carbon, or composite construction, operate on the premise of converting mechanical energy into thermal energy to stop the aircraft upon landing. Such braking operations generally result in the generation of significant heat within the brake disk stack, and the transfer of a significant portion of this heat to other components of the wheel and brake assembly. Those skilled in the art understand that such stacks include a plurality of alternatingly interleaved stator and rotor disks, the former being effectively affixed to the axle of the wheel, and the latter being effectively connected to the wheel itself. Brake actuation devices, such as pistons and return mechanisms, achieve the forceful inter-engagement of rotor and stator disks.

Because of the high temperatures induced in aircraft brake assemblies, heat shields are often used to thermally isolate the heat stack from the wheels, actuator, and other aircraft components. Such heat shields have often included ceramic fibers or other types of insulating materials interposed between the inner and outer heat shield housing layers. However, when brakes are serviced and/or cleaned, cleaning fluids have been found to wick into the insulating materials and to generate significant smoke when subjected to the elevated temperatures encountered during braking operations. Such smoke is obviously undesirable, even if not hazardous. Further, this absorption of fluids by the insulation can also degrade the properties of the insulation.

In prior art aircraft brakes it has also been found that air passages within and about the heat stack are quite restricted. Since it is most desirable to effectuate a cool down of the heat stack in as short a time as possible, it is most desirable that air passageways in and about the heat stack be maximized so that brake cool down can be accelerated and aircraft turnaround time minimized. A specific problem respecting thermal dissipation from the brake heat stack is the lack of adequate annular air space between the brake stack and the wheel. These spaces are constrained by the spacing of adjacent rotor lug faces, rotor and stator outside diameter surfaces, wheel keys and the wheel heat shield. The necessarily compact nature of the brake assembly itself provides little space for the inflow of cool ambient air to these annular spaces. Accordingly, dissipation of heat built up within the brake assembly during a landing/braking operation is delayed by the inability of ambient air to access these areas for the necessary convection.

It has also been well known that heat shields interposed between the brake disk stack and the aircraft wheel and tire have typically been of a uniform cylindrical nature and, while serving to provide an insulating barrier between the brake disk stack and the wheel/tire assembly, the heat shield has not been conducive to enhanced natural convection. In other words, the heat shield has not served to facilitate the passage of air between the cylindrical portion of the heat shield and the brake stack, but has simply been configured for thermal isolation purposes.

There is a need in the art for an aircraft wheel and brake assembly in which the heat shield or shields are so configured as to preclude the wicking of cleaning fluids and the like thereto. There remains a similar need in the art for a heat stack configuration which allows enhanced brake cooling by appropriately configured cooling passages in the lug areas of rotor disks. There also remains in the art the need for heat shields particularly configured to increase the cooling rate of an aircraft brake through enhanced natural convection.

SUMMARY OF THE INVENTION

In light of the foregoing, it is a first aspect of the invention to provide an aircraft wheel and brake assembly having a heat shield or shields comprised of one or more sealed pouches.

Another aspect of the invention is the provision of an aircraft wheel and brake assembly in which the heat shield or shields are configured of one or more sealed pouches which contain therein ceramic or other insulating materials.

Still a further aspect of the invention is the provision of an aircraft wheel and brake assembly in which the heat shield pouches are either vacuum sealed or provided with pinhole breathing apertures which minimize thermal expansion, while precluding the wicking of cleaning fluids and the like into the insulating materials.

Yet another aspect of the invention is the provision of an aircraft wheel and brake assembly in which the rotors and stators of the brake disk stack are configured to have apertures in the lugs thereof to accomodate the passage of cooling air.

Still a further aspect of the invention is the provision of an aircraft wheel and brake assembly in which the rotor and stator disks of the brake disk stack are configured with thermal passages in the lugs thereof to provide for enhanced airflow about the periphery of the disks, and in which the disks have increased lug strength as compared to prior art disks employing scallops and the like between the drive keyways.

Yet an additional aspect of the invention is the provision of an aircraft wheel and brake assembly in which the heat shield interposed between the heat stack and wheel/tire assembly of the aircraft includes both a cylindrical portion and a flared end portion accommodating natural convection of ambient air across the brake disk stack.

Yet a further aspect of the invention is the provision of an aircraft wheel and brake assembly having increased thermal efficiency which allows for more rapid turnaround time of aircraft as previously experienced, safer operation and more effective braking than corresponding systems of the prior art.

The foregoing and other aspects of the invention which will become apparent as the detailed description proceeds are achieved by an aircraft wheel and brake assembly, comprising: a wheel mounted upon an axle; a brake assembly interposed between said wheel and said axle; and a heat shield interposed between said wheel and said brake assembly, said heat shield comprising at least one pouch having sealed edges.

Other aspects of the invention are achieved by an aircraft wheel and brake assembly as previously described, and wherein said brake assembly comprises a heat stack of interleaved alternating stator and rotor disks, and wherein said disks have circumferentially spaced lugs separated by keyways, said lugs having air passages therein.

Yet a further aspect of the invention is attained by an aircraft wheel and brake assembly as previously described, and wherein the heat shield comprises a cylindrical portion interposed between the wheel and a brake stack of the brake assembly and a flared portion extending from said cylindrical portion inwardly toward an actuator of said brake assembly.

Additional aspects of the invention are achieved by an aircraft brake disk stack, comprising: a plurality of annular stator disks having uniformly circumferentially spaced lugs about an inner circumference thereof; and a plurality of annular rotor disks interleaved with said stator disks and having uniformly circumferentially spaced lugs about an outer circumference thereof.

Still further aspects of the invention are achieved by an improvement in an aircraft brake assembly having an axle, a hub, a wheel, a brake disk stack, and a brake actuator, the improvement comprising: a heat shield interposed between the wheel and brake disk stack, said heat shield being substantially cylindrical, and having a funnel-shaped mouth at an end thereof.

BRIEF DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Figure 1:
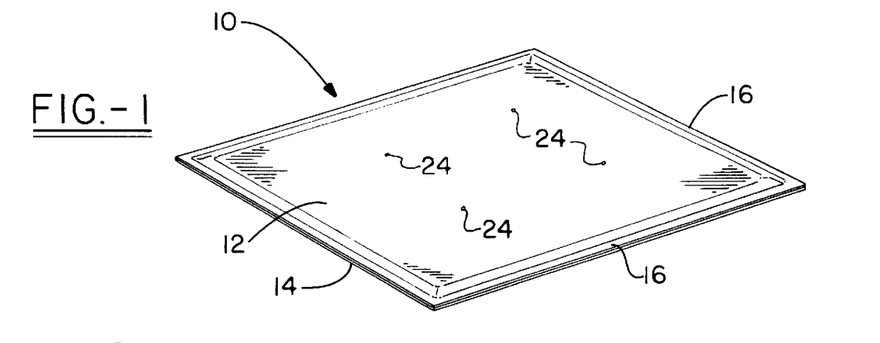
FIG. 1 is a perspective view of an insulating pouch according to the invention.
Figure 2A:
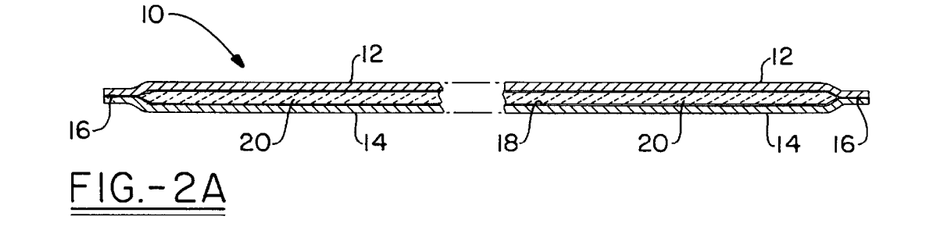
FIGS. 2A and 2B are cross sectional views of illustrative insulating pouches according to the invention.
Figure 2B:
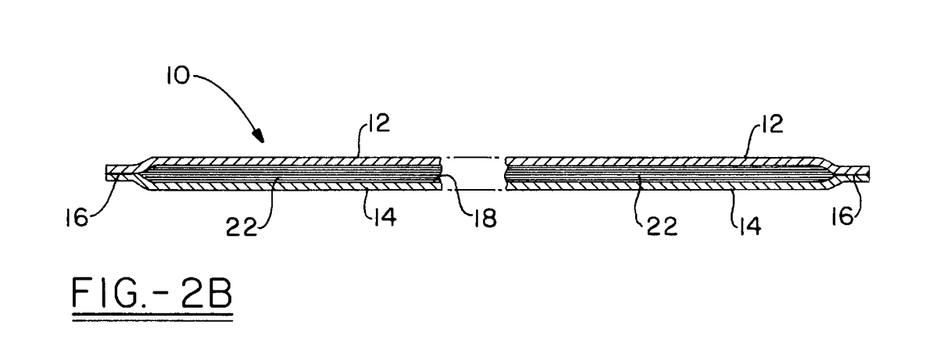

Referring now to the drawings and more particularly to FIGS. 1, 2A and 2B, it can be seen that an insulating pouch made in accordance with the invention is designated generally by the numeral 10. The pouch 10 consists of oppositely disposed metallic foil layers or skins 12, 14 which are substantially congruent with each other. The metallic foil skins 12, 14 are quite thin, having a thickness on the order of 0.001–0.005 inches. The pouch 10 is formed by welding or otherwise sealing the metal foil skins 12, 14 to each other about the periphery 16 thereof, thereby defining a cavity 18 therein. A ceramic mat 20 is, in one embodiment of the invention, disposed within the cavity 18. The ceramic mat 20 is typically comprised of meshed ceramic fibers, such as those of aluminum oxide or the like. While the embodiment of the invention as shown in FIG. 2A consists of a ceramic mat for insulating purposes, the invention also contemplates the utilization of intermixed or alternating ceramic papers and metallic foils 22 within the cavity 18 as shown in the embodiment of FIG. 2B. In any event, those skilled in the art will appreciate that a heat shield, consisting of one or more abutting insulating pouches 10 may be interposed between the various structures of a wheel and brake assembly to limit transfer of heat and to protect or otherwise shield specific structures.

In accordance with the invention, a plurality of pinholes 24, having a diameter on the order of 0.001 inch may be provided in either one or both of the skins 12, 14 to allow the cavity 18 to breathe. These pinholes 24 serve to reduce or eliminate gas expansion forces within the pouch while preventing any significant ingress of moisture, by way of water, cleaning fluids, or the like to the interior thereof. It is also contemplated by the invention that this result may also be achieved by simply vacuum sealing the metallic foil skins 12, 14 defined by insulating pouch 10.

Figure 3:
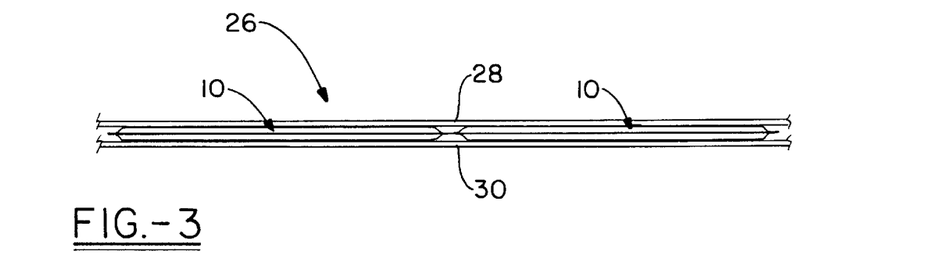
FIG. 3 is an elevational view of a heat shield structure made in accordance with the invention.

With reference now to FIG. 3, it can be seen that the heat shield structure employing the concept of the invention is designated generally by the numeral 26 and includes one or more insulating pouches 10 sandwiched between heat shield sheets 28, 30. These heat shield sheets are, as previously known in the art, of a thin metallic construction and serve both to define and confine the insulating structure of the invention.

Figure 4:
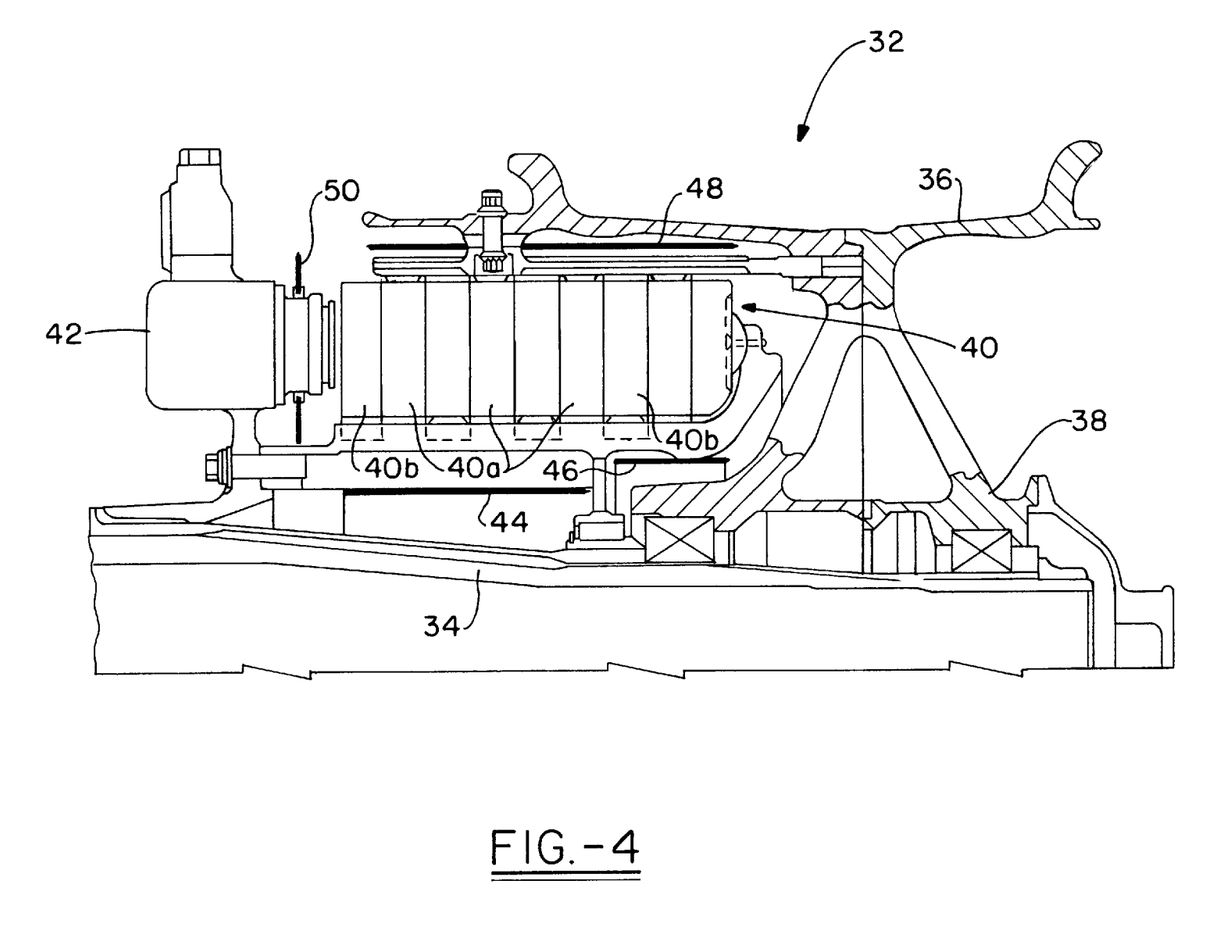
FIG. 4 is an elevational view, primarily schematic with some elements shown in partial cross section, of a wheel and brake assembly incorporating the heat shield in accordance with the invention.

An aircraft wheel and brake assembly 32 is shown in FIG. 4 to include an axle 34 adapted for receiving a wheel 36 and having a hub 38. A brake heat stack 40 includes a plurality of alternatingly interleaved rotors 40a effectively attached to the wheels, and stators 40b, effectively attached to the axle. A brake piston and return mechanism, also referred to as an actuator, is designated by the numeral 42. Those skilled in the art will readily appreciate that braking activity is achieved by actuation of the brake actuator 42 to cause the rotors 40a and stators 40b to engage each other within the heat stack 40. By this process, mechanical rotating energy of the wheel is converted into thermal energy for dissipation by the heat stack. In accordance with the invention, heat shield structures such as the structure 26 may be interposed within the aircraft wheel and brake assembly at various points as illustrated in FIG. 4. By way of example, a heat shield 44 may be interposed about the axle 34 and between such axle and heat stack 40. Similarly, a wheel hub heat shield 46 may be interposed about the wheel hub 38 and between such hub and brake stack 40. Additionally, a heat shield 48 may be interposed between the wheel 36 and the brake stack 40, while the heat shield 50 may be interposed between the various actuators 42 and the heat stack 40.

It should thus be apparent that the concept of the invention of employing insulating pouches 10 is to provide for a pair of metallic foil layers which are welded or otherwise joined along common edges to form a thin, flexible pouch that is sealed from gas or liquid infiltration. The pouch 10 contains a high performance insulation material such as a fibrous ceramic mat 20, layers of fiber ceramic paper, woven ceramic textile, or alternating ceramic papers/metallic foil layers, as may be chosen by one skilled in the art. The pouch 10 is inserted between the rigid metallic layers 28, 30 of an aircraft brake heat shield, thereby increasing the thermal effectiveness of the shield over that previously known in the art. These heat shield layers protect the foil pouch 10 from damage resulting from rough handling or debris, and also act to contain pouch expansion forces resulting from heating of the internal air. Of course such thermal expansion forces may be reduced or eliminated by either vacuum sealing the pouch 10 or introducing pin holes into the metallic foil skins 12, 14 to allow the pouch to breathe. Of course, the pin holes 24 would be of a sufficiently small size to preclude the ingress of moisture and fluids.

Figure 5A:
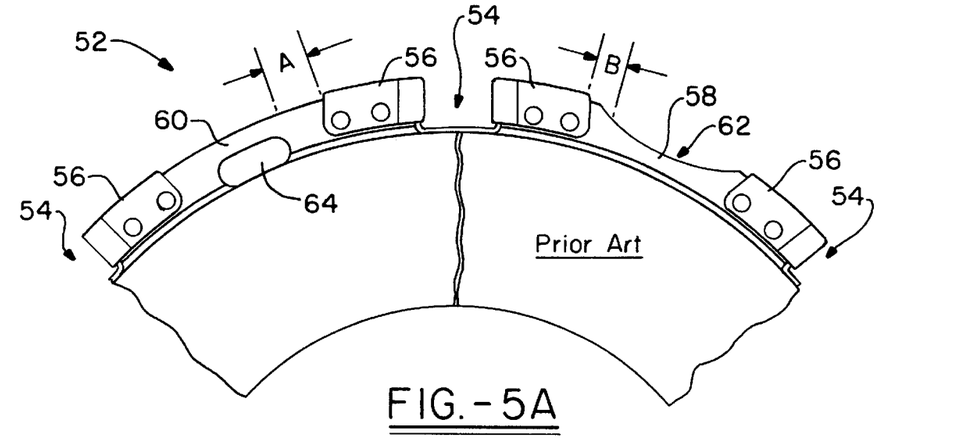
FIGS. 5A–5F, are partial plan views of brake disk configurations showing cooling apertures or slots in the lugs thereof, and with FIG. 5A also comparatively illustrating a prior art rotor disk having a scalloped lug.
Figure 5B:
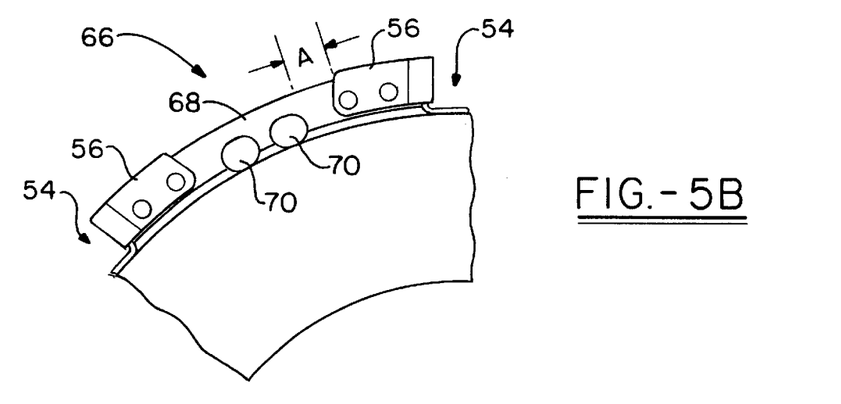
Figure 5C:
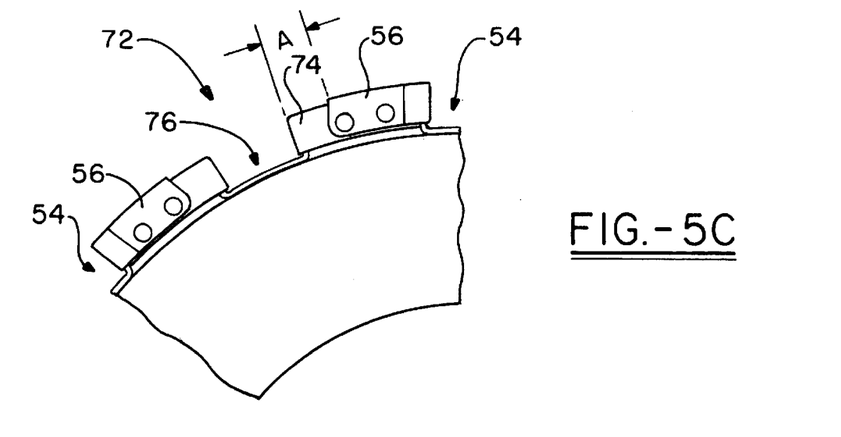

With reference now to FIGS. 5A–5D, an additional concept of the invention for achieving brake cooling is shown in the context of a modified brake disk. The concept of the invention is to modify the lug region of the disks to not only accomodate the passage of ambient cooling air, but, in the context of a rotor disk, to also strengthen the lug over prior art designs. In the past, in the air spaces between the brake stack and the wheel adjacent to the rotor lug faces, rotor and stator outside diameter surfaces, wheel keys, and the wheel heat shield have been quite constrained. While the prior art has taught the implementation of scallops in the lugs interposed between the keyways of the rotors, it has been found that such scallops may tend to reduce the strength of the disk at the keyway area due to the proximity of the scallops to the rivets retaining the driving clips. Accordingly, FIGS. 5A–5C present modified brake rotor disks such as rotor disks 40a of the heat stack 40 presented in FIG. 4. As shown in FIG. 5A, a rotor disk is designated generally by the numeral 52. As is well known to those skilled in the art, the rotor disk 52 is provided with a plurality of uniformly spaced keyways 54 for effective engagement with the aircraft wheels. Drive clips 56 are provided on either side of the keyway 54 and riveted to the disk, as shown. Lugs 58, 60 are, accordingly, defined between the keyways 54 in a circumferentially uniformly spaced manner.

The disk 52 of FIG. 5A is configured to illustrate a lug configured according to the prior art, as well as one configured according to the invention. The disk 52 is divided by a dashed line, as shown, to separate the two different designs. In accordance with the prior art, the lug was characterized by a scallop 62 extending between pairs of keyways 54. The scallops 62 comprised radiused removals of disk material to provide for some air passage. However, the radiused nature of the scallop 62 was provided for the purpose of seeking to maintain a reasonable mass of the disk material at the closest rivets of the clips 56, to provide substantial shear strength, while also seeking to provide a passage of appropriate size for air movement.

The concept of the instant invention, as shown in FIGS. 5A–5C, is to provide for increased material at the rotor lugs for providing increased shear area in the region where rotor lug failure is most likely to occur. In particular, the mass between the keyway clip and the air passage aperture is increased. As shown in FIG. 5A, this is achieved by eliminating the scallop 62 and providing for an air passage in the form of an aperture 64 interior of the lug 60. This configuration allows for a complete bridge of material about the outer circumferential lug area. Moreover, and as shown in FIG. 5A, the use of scallops 62 provided for an effective mass between the rivets of the drive clip and the scallop 62 designated by B. This same area is increased in accordance with the concept of employing the ovalized apertures 64 to the distance A. With A being greater than B, the shear forces that can be sustained by the lug employing the aperture 64 are greatly improved over those employing scallops 62. Moreover, not only is the mass of thickness A provided, but an entire bridge about the circumferential area of the lug 60 is maintained intact.

In similar fashion, FIG. 5B presents a rotor disk 66 having a lug 68 characterized by a pair of apertures 70 therein. Again, the spacing A of the apertures 70 from the rivets of the drive clip 56 is greater than the corresponding effective spacing B associated with the scalloped lug of FIG. 5A. Yet further, a continuous bridge of material about the outside circumferential portion of the rotor disk 66 provides for enhanced shear strength, while allowing for effective cooling.

With reference to FIG. 5C, yet another embodiment of a brake rotor disk 72 can be seen as having a lug 74 with a cooling slot 76 therein. In this instance, the bridge of continuous material across the lug is eliminated, but the lug can be such that the dimension A is sufficiently larger than the dimension B in the prior art that enhanced shear strength is realized, despite the absence of the bridging effect.

In accordance with the concept of the invention as set forth in FIGS. 5A–5B, the cooling apertures or slots are inset further from drive clips 56 than in the past, and, accordingly, enhanced strength is realized. Also, the apertures or slots can be made larger than the scalloped area of the past and, accordingly, increased air passage can be realized. A key to the concept of the invention is to simply maximize the material within the lug, particularly that between the cooling apertures/slots and the rivets retaining the drive clips, while maintaining the apertures or slots outside of the rubbed areas of brake disk. In other words, it is particularly desired that such cooling apertures or slots are interposed only in the lug areas and do not infringe upon the braking or rubbed areas of the disk.

Figure 5D:
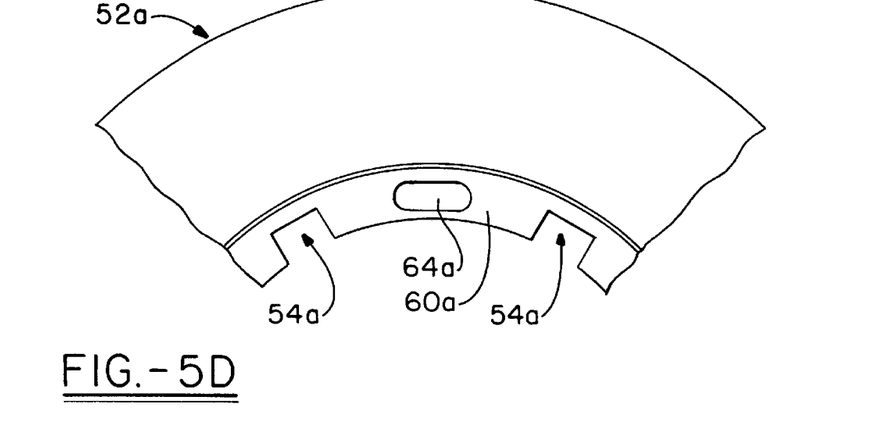
Figure 5E:
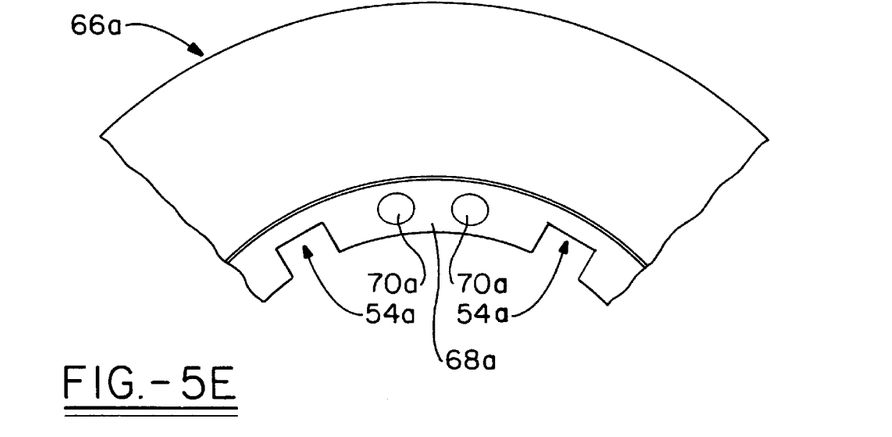
Figure 5F:
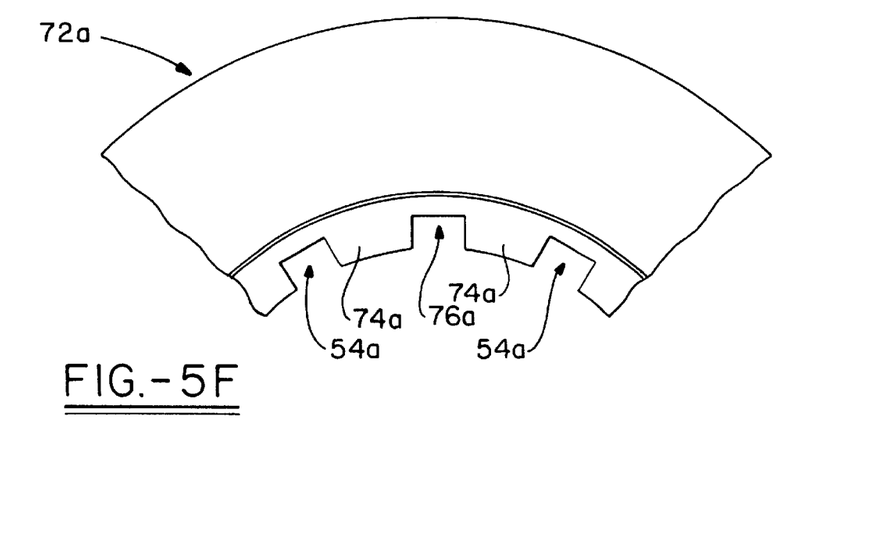

The concept just described is also applicable to stator disks, as shown In FIGS. 5D–5F. Here, stator disks 52a, 66a, and 72a correspond to the rotor disks 52, 66 and 72 of FIGS. 5A–5C. In the case of the stator disks, inner circumferential lugs 60a, 68a and 74a are separated by keyways 54a, with appropriate cooling apertures 64a, 70a and slot 76a presented therein. Although not shown, it will be understood that drive clips would typically be received by the keyways 54a as with the rotor disks of FIGS. 5A–5C. As with the rotors, these stator configurations provide for significant cooling capabilities without compromising disk strength or integrity. In the case of the apertures, the lugs remain substantial and bridged. In the case of the slot, the substantial nature of the lug material adjacent the keyways is sufficient for the requisite strength.

Yet a further concept of the invention is set forth in FIGS. 6A–6D in the form of a flared cylindrical heat shield for maintenance between the tire and wheel assembly of the aircraft and the heat sink of the brake assembly. Those skilled in the art understand that it is most desirable to optimize the cooling rate of aircraft brakes so as to minimize the turnaround time of the associated aircraft. The instant invention contemplates increasing the cooling rate by enhancing natural convection by a unique construction and configuration of the heat shield interposed between the brake disk stack and the tire/wheel assembly. In general, this is done by flaring the end of the otherwise cylindrical shield to reduce resistance to air inflow and outflow to and from the wheel and brake assembly. As shown in FIGS. 6A–6D, a wheel and brake assembly 78 for an aircraft is shown as including a wheel 80 having a flange 82 receiving a tire bead 84. The heat stack 86 of the brake assembly is maintained in close proximity to the wheel 80 and associated tire, as shown. A brake actuator and return mechanism 88 is provided in association with the heat stack 86, in standard fashion.

Figure 6A:
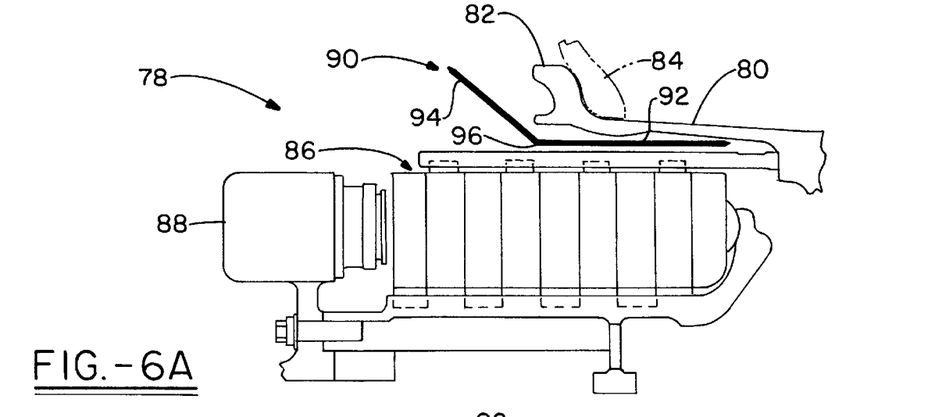
FIGS. 6A–6D are elevational views schematically illustrating flared heat shields interposed between the brake disk stack and wheel/tire assembly of an aircraft made in accordance with the invention.

As shown in FIG. 6A, in accordance with one embodiment of the invention a heat shield 90, which might be of the type described herein with respect to FIGS. 1–4, is provided with a cylindrical portion 92 and a flared portion 94, the two being joined at a knee 96. According to this embodiment of the invention, the knee 96 is substantially aligned with the inner edge of wheel flange 82, as shown. The flared portion 94 is configured in the shape of a cone, having an angle on the order of 10°–45°, with the angle being sought to be maximized in view of envelope constraints. The flared or cone portion 94 serves to maximize air flow across the heat stack 86.

Figure 6B:
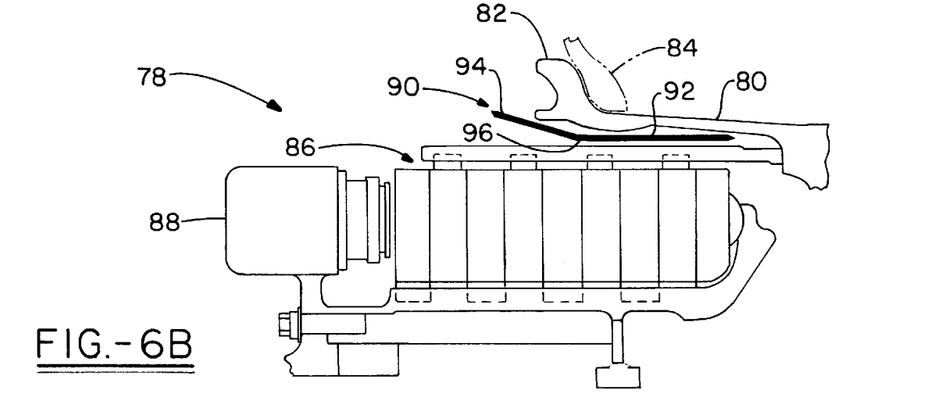

As shown in FIG. 6B, the wheel and brake assembly 78 may be provided with a heat shield 90 in which the knee 96 is inboard of the flange 82 such that the flare 94 follows a corresponding flare of the flange 82. Such a configuration, of course, is again provided to accomodate packaging efficiencies. In this embodiment, the flared conical portion 94 is closely adjacent the wheel flange 82, rather than having the knee 96 substantially adjacent the inner terminal edge of the flange 82.

Figure 6C:
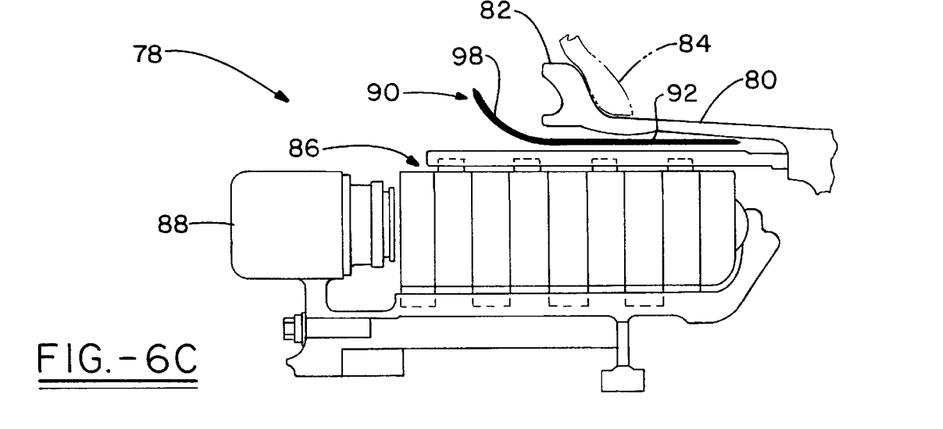

As shown in FIG. 6C, a wheel and brake assembly 78 is shown with the heat shield 90 having a basic cylindrical portion 92 and with a bell-shaped flare 98, the flare 98 being radiused from the cylindrical portion 92, rather than angled with the knee 96 as in the embodiment of FIGS. 6A and 6B.

Figure 6D:
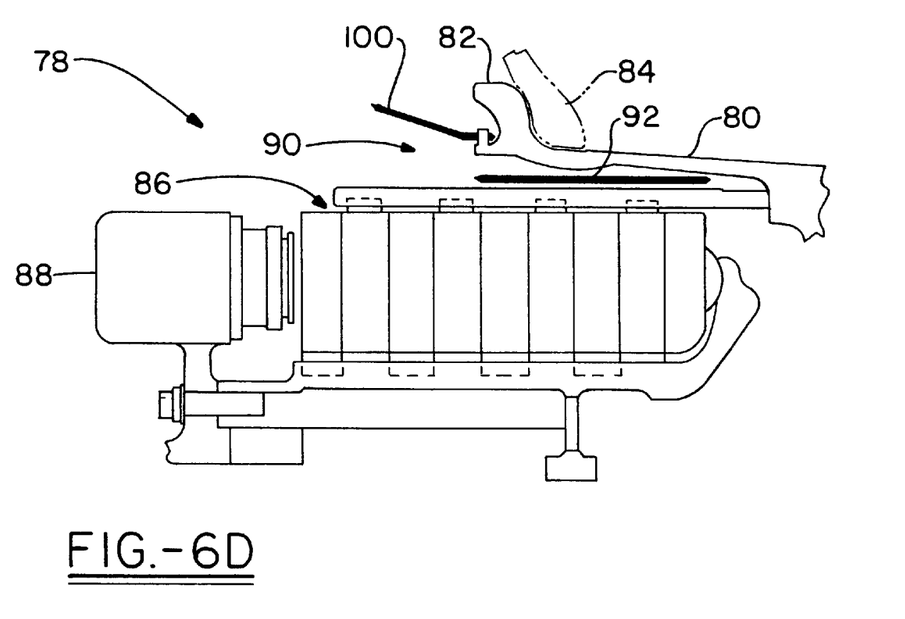

As shown in FIG. 6D, yet another embodiment of the invention is shown in association with a wheel and brake assembly 78. Here, a cylindrical heat shield 92 is interposed between wheel 80 and the heat stack 86. A flared conical shield 100 is attached to and rotatable with the wheel 80. While the particular angle of the conical shield 100 may vary to satisfy packaging constraints, it is preferred that the angle, taken with reference to the axis of the heat stack 86, be on the order of 10°–45°.

The flared, conical, or bell-shaped open end of the heat shield shown in FIG. 6A–6D reduce resistance to buoyancy induced air inflow occurring over a lower portion of he heat shield and air outflow occurring over the upper portion. The flared opening of he heat shield increases in radial dimension with increased axial position taken with respect to the inboard end of the assembly and may take any of a variety of cross-sections as shown in the drawings. The flare may extend between wheel key bosses to maximize air flow over the brake stack, if desired. The flared section may also be an extension of an existing wheel heat shield or a separate component attached to the wheel itself. It will also be appreciated, particularly with respect to the concept presented in FIGS. 1–4 herein, that the heat shield may be of a single or multiple layer construction and/or it can incorporate insulating materials for increased thermal protection. The length of the flare will be selected to provide the desired amount of shielding of the wheel and tire, within the constraints of the envelope available. The flared shield eliminates the abrupt contraction and expansion of flow at the wheel inboard entrance and exit for airflow passage, thereby minimizing flow separation and frictional losses and increasing the rate of bulk cooling flow through the wheel and brake assembly. Accordingly, the flared heat shield presented herein increases natural convection airflow and accommodates faster aircraft turnaround time, increased braking system efficiency and reliability, and reduced risk of heat related damage. In addition, it has been found that the flared shield also offers advantages with regard to the ease of insertion of the brake assembly into the wheel during installation procedures.

Thus it can be seen that the objects of the invention have been satisfied by the structure presented above. While in accordance with the patent statutes only the best known and preferred embodiments of the invention have been presented and described in detail, the invention is not limited thereto or thereby. Accordingly, for an appreciation of the true scope and breadth of the invention reference should be made to the following claims.

What is claimed is:

1. An aircraft wheel and brake assembly, comprising:
a wheel mounted upon an axle;
a brake assembly interposed between said wheel and said axle; and
a heat shield interposed between said wheel and said brake assembly, said heat shield comprising at least one pouch having sealed edges, said pouch comprising a pair of metallic skins overlaying each other and sealed about a periphery thereof to define an envelop, said envelope being filled with insulating material, and said metallic skins being characterized by pin hole apertures therein.

2. The aircraft wheel and brake assembly according to claim 1, wherein said pin hole apertures are on the order of 0.001 inch diameter.

3. The aircraft wheel and brake assembly according to claim 1, wherein said insulating material comprises ceramic filler.

4. The aircraft wheel and brake assembly according to claim 1, wherein said insulating material comprises interleaved ceramic and foil layers.

5. The aircraft wheel and brake assembly according to claim 1, further comprising a heat shield of a sealed pouch filled with insulating material interposed between said brake assembly and said axle.

6. The aircraft wheel and brake assembly according to claim 5, further comprising a heat shield of a sealed pouch filled with insulating material interposed between a heat stack and a piston and return mechanism of said brake assembly.

7. The aircraft wheel and brake assembly according to claim 1, wherein said brake assembly comprises a heat stack of interleaved alternating stator and rotor disks, and wherein said rotor disks have circumferentially spaced lugs separated by keyways, said lugs having air passages therein.

8. The aircraft wheel and brake assembly according to claim 7, wherein said air passages a re uniformly spaced between said keyways.

9. The aircraft wheel and brake assembly according to claim 8, wherein said air passages comprise apertures.

10. The aircraft wheel and brake assembly according to claim 8, wherein said air passages comprise slots extending from circumferential edges of said lugs radially inward.

11. The aircraft wheel and brake assembly according to claim 1, wherein said heat shield comprises a cylindrical portion interposed between said wheel and a brake stack of said brake assembly and an outwardly flared portion extending from said cylindrical portion toward an actuator of said brake assembly.

12. The aircraft wheel and brake assembly according to claim 11, wherein said flared portion is separate from said cylindrical portion, said flared portion being fixed to said wheel.

13. The aircraft wheel and brake assembly according to claim 11, wherein said flared portion is integral with said cylindrical portion.

14. The aircraft wheel and brake assembly according to claim 13, wherein said flared portion is bell shaped.

15. The aircraft wheel and brake assembly according to claim 13, wherein said flared portion is conical.

16. The aircraft wheel and brake assembly according to claim 15, wherein said conical flared portion forms an angle with said cylindrical portion of between 10°–45°.

17. An improvement in an aircraft brake assembly having an axle, a hub, a wheel, a brake disk stack, and a brake actuator, the improvement comprising:

a heat shield interposed between the wheel and brake disk stack, said heat shield being substantially cylindrical, and having an outwardly extending funnel-shaped mouth at an inboard end thereof to increase air flow over the brake disk stack, said heat shield being of increasing diameter as a function of increasing axial inboard position.

* * * * *